(12) United States Patent
Bachir

(10) Patent No.: US 9,579,986 B2
(45) Date of Patent: Feb. 28, 2017

(54) SUPPORTING STRUCTURE FOR AN ELECTRIC VEHICLE TRACTION BATTERY

(75) Inventor: Alain Bachir, Saint Germain de la Grange (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 1387 days.

(21) Appl. No.: 13/496,129

(22) PCT Filed: Sep. 2, 2010

(86) PCT No.: PCT/FR2010/051828
§ 371 (c)(1),
(2), (4) Date: Apr. 26, 2012

(87) PCT Pub. No.: WO2011/030046
PCT Pub. Date: Mar. 17, 2011

(65) Prior Publication Data
US 2012/0228245 A1    Sep. 13, 2012

(30) Foreign Application Priority Data
Sep. 14, 2009   (FR) ..................................... 09 04379

(51) Int. Cl.
*B23P 19/00* (2006.01)
*H05K 13/04* (2006.01)
(Continued)

(52) U.S. Cl.
CPC ....... *B60L 11/1822* (2013.01); *B60L 11/1877* (2013.01); *B60L 11/1879* (2013.01);
(Continued)

(58) Field of Classification Search
CPC .............. B60L 11/1822; B60L 11/1877; B60L 11/1879; B60K 1/04; B60K 2001/0472;
(Continued)

(56) References Cited

U.S. PATENT DOCUMENTS

| 5,360,307 | A | * | 11/1994 | Schemm | B60K 1/04 104/34 |
| 5,612,606 | A | | 3/1997 | Guimarin et al. | |
| 5,760,569 | A | * | 6/1998 | Chase, Jr. | B60K 1/04 320/110 |
| 6,547,020 | B2 | * | 4/2003 | Maus | B60K 1/04 180/68.5 |
| 2004/0136815 | A1 | | 7/2004 | Sellhorn et al. | |

FOREIGN PATENT DOCUMENTS

DE        298 12 938       9/1999
DE     20 2006 019412      3/2007
(Continued)

OTHER PUBLICATIONS

French Search Report Issued May 21, 2010 in FR 09 04379 Filed Sep. 14, 2009.
(Continued)

*Primary Examiner* — Donghai D Nguyen
(74) *Attorney, Agent, or Firm* — Oblon, McClelland, Maier & Neustadt, L.L.P.

(57) ABSTRACT

A supporting structure for transporting a traction battery of a vehicle having an electric power train. The supporting structure includes a frame on which a plate is mounted, whereby the plate can hold a traction battery in place by at least one first linking element that can geometrically align the traction battery in relation to the structure. The supporting structure is particularly suitable for managing the different batteries to be found at a battery exchange station.

10 Claims, 3 Drawing Sheets

(51) Int. Cl.
*B60L 11/18* (2006.01)
*B60K 1/04* (2006.01)

(52) U.S. Cl.
CPC ... *B60K 2001/0472* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *Y10T 29/49815* (2015.01); *Y10T 29/49826* (2015.01)

(58) Field of Classification Search
CPC ............ Y02T 10/7005; Y02T 10/7072; Y02T 90/124; Y02T 90/14; Y02T 10/705; Y10T 29/49815; Y10T 29/49826
USPC ...... 29/529.1, 426.1, 729, 760, 832; 104/34; 180/68.5; 320/104, 110, 124; 414/809; 429/100
See application file for complete search history.

(56) References Cited

FOREIGN PATENT DOCUMENTS

EP    1 405 778    4/2004
FR    2 721 559    12/1995

OTHER PUBLICATIONS

International Search Report Issued Nov. 4, 2010 in PCT/FR10/51828 Filed Sep. 2, 2010.

\* cited by examiner ced-battery.

SUPPORTING STRUCTURE FOR AN ELECTRIC VEHICLE TRACTION BATTERY

BACKGROUND

The present invention relates to a supporting structure, of the sledge type, making it possible to convey and to place traction batteries in reference position relative to a housing formed in a vehicle with an electric traction system in which the latter are designed to be installed.

The invention finds a particularly advantageous, but not exclusive, application in the field of exchange of traction batteries of vehicles provided with removable traction batteries in battery-exchange stations.

The invention also finds application in the field of installation of a traction battery in a vehicle provided with an electric traction system in a factory for assembling such vehicles but also in any location in which the battery could be conveyed outside the vehicle as in the after-sales network etc.

Specifically, although the energy density that can be stored in traction batteries has progressed greatly, vehicles with fully electric traction systems still have however a range deficit relative to a vehicle with a heat traction system. One solution for allowing these vehicles with fully electric traction systems to achieve services equivalent to those of vehicles provided with a heat traction system lies in the deployment of automated battery-exchange stations, of the type of that disclosed in document U.S. Pat. No. 5,612,606. In these stations, a user may exchange the discharged traction battery of his vehicle with a recharged battery in a particularly short time and in great comfort by reason of the automation of the exchange.

The stations that are envisaged must be able to exchange batteries, the weight of which is high in order to increase the range between two battery exchanges and the shape and volume of which may differ from one model of vehicle to another. This limits the multiplication of battery-exchange stations in order to maintain an acceptable cost of battery-exchange infrastructure. It is therefore understandable that it is necessary to develop a universal station that makes it possible to reduce the cost of covering the exchange-station territory.

BRIEF SUMMARY

Also, the technical problem to be resolved by the subject of the present invention is to propose a device that makes it possible to handle traction batteries that are different and of heavy weight in an automatic, reproducible and precise manner, notably for the purpose of exchanging them in a single type of battery-exchange station irrespective of the geometric characteristics of these batteries, and to do so at low cost.

The solution to the technical problem posed consists, according to the present invention, in a supporting structure designed to convey a traction battery of a vehicle provided with an electric traction system, characterized in that it comprises a frame on which a tray is installed that is capable of retaining a traction battery, by means of at least one first connecting element capable of performing a geometric reference positioning of the traction battery relative to said supporting structure.

The invention as thus defined has in any case the advantage of providing very great flexibility of use at a reduced cost since it is sufficient for receiving a battery, for using the appropriate supporting structure making any battery compatible with standardized handling devices.

The installation and removal of a great variety of batteries is thus possible at a particularly low cost.

Moreover, it is possible to position a variety of batteries in a precise and reproducible manner while ensuring a reliable and constant positioning of the battery relative to the handling device.

Thus, a universal battery-exchange station can deal with a large variety of batteries by adopting as many supporting structures as there are battery types, the rest of the elements of the exchange station remaining identical and standard.

It is possible to arrange for the first connecting element to be situated on the tray so as to connect the tray to the traction battery.

It is possible to arrange for said structure to comprise at least three first connecting elements and in that at least one of them is capable of allowing a correction of the reference positioning of the battery in order to ensure isostatism of the battery so that the means for electrical locking and connection of the battery and of the vehicle can interact precisely.

It is possible to arrange for the tray to be installed in a removable manner on the frame in order to make the maintenance operations easier and to reduce the cost thereof. Moreover, in order to adapt said structure to a new battery type, it is then sufficient to redevelop and replace only the tray.

It is possible to arrange for said structure to comprise at least one second connecting element capable of performing a reference positioning of said structure on a handling device on which it rests, of the conveyor or lift-table type.

It is possible to arrange for the second connecting element to be situated on the tray so as to perform a reference positioning of the tray relative to the handling device on which said structure rests.

It is possible to arrange for the first and second connecting elements to be installed in a removable manner on said supporting structure in order to carry out through the latter a geometric reference positioning of the battery with the handling device.

It is possible to arrange for the frame to be provided with eyelets so that said supporting structure can be handled with the aid of a pallet-handling truck, which makes the handling of the battery easier in warehouses and to limit the risks of damage to the batteries during these operations.

A further subject of the invention is a method for removing a battery from a housing formed in a vehicle, comprising the steps of:

placing a supporting structure according to the invention on a handling device, of the lift-table type, by making second connecting elements interact with corresponding guide fingers of the handling device;

bringing the handling device closer until the first connecting elements of the supporting structure interact with the battery;

unlocking the battery from its housing in the vehicle;

moving the handling device away from the vehicle so that the battery is extracted from its housing.

According to another subject, the invention relates to a method for installing a battery in a housing formed in a vehicle, comprising the steps of:

placing a supporting structure according to the invention on a handling device, of the lift-table type, so that connecting elements interact with the corresponding guide fingers of the handling device;

carrying the battery up to its housing in the vehicle by actuating the handling device;

locking the battery in the housing of the vehicle.

According to another feature, before the other installation steps, the battery is placed on the supporting structure so that the first connecting elements interact with the battery.

The supporting structure according to the invention also finds application in a method for exchanging a battery in a battery-exchange station in which a discharged battery housed in a vehicle received according to the removal method of the invention is removed, then a recharged battery is installed in the housing of the vehicle according to the installation method of the invention in a removal-installation zone and in which the discharged and recharged batteries are conveyed respectively from the removal-installation zone to a recharging zone provided in the station, and from the recharging zone to the removal-installation zone while resting on supporting structures according to the invention.

The present invention also relates to the features that will emerge during the following description and which must be considered in isolation or in all their technically possible combinations.

BRIEF DESCRIPTION OF THE DRAWINGS

This description, given as a nonlimiting example, is designed to make it easier to understand what the invention consists in and how it can be embodied. It is moreover given with reference to the appended drawings in which.

DETAILED DESCRIPTION

For reasons of clarity, the same elements have been indicated by identical references. Similarly, only the elements that are essential for understanding the invention have been shown, and this is done not to scale and in a schematic manner.

Figure 1:
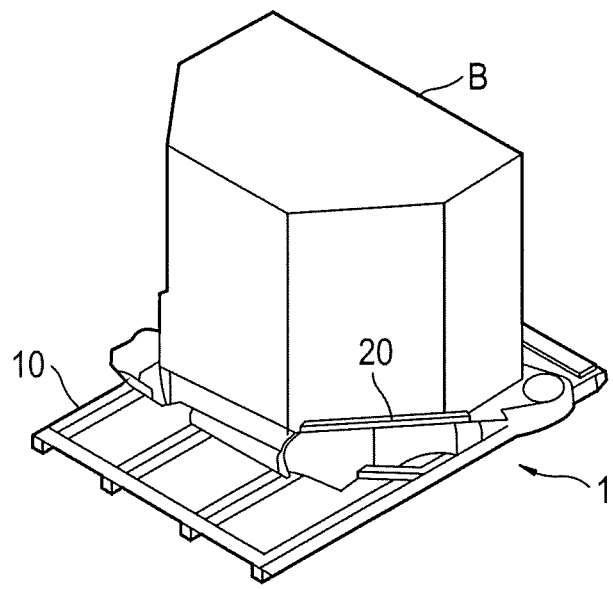
FIG. 1 is a view in perspective showing a traction battery placed on a supporting structure according to the invention.

FIG. 1 illustrates a supporting structure 1, of the sledge type, on which a traction battery B rests. The supporting structure 1 comprises a frame 10 and a tray 20 which forms an interface with a bottom portion of the battery B.

In one particular embodiment, chosen only as an example, the tray 20 is installed in a removable manner on the frame 10, for example by a bolt-nut combination, by riveting or else by welding.

This therefore makes it possible to provide a single, standard frame irrespective of the type of battery B to be supported. It is then sufficient to modify the shape and the location of the tray 20 on the frame for the supporting structure 1 to be compatible with several types of batteries B.

Moreover, during the maintenance and inspection of the conformity of the supporting structure 1, in the case in which only one of the frame 10 and the tray 20 is defective, this makes it possible to replace only one of them.

Figure 2:
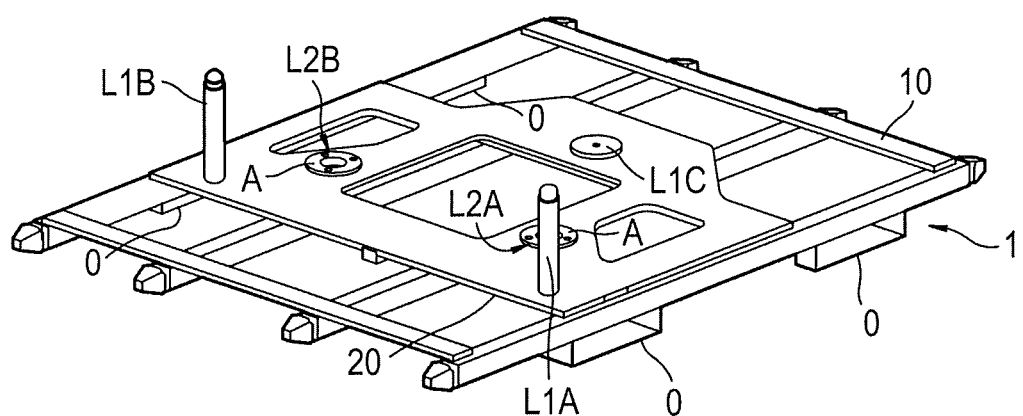
FIG. 2 is a view in perspective of the supporting structure according to the invention.
Figure 3:
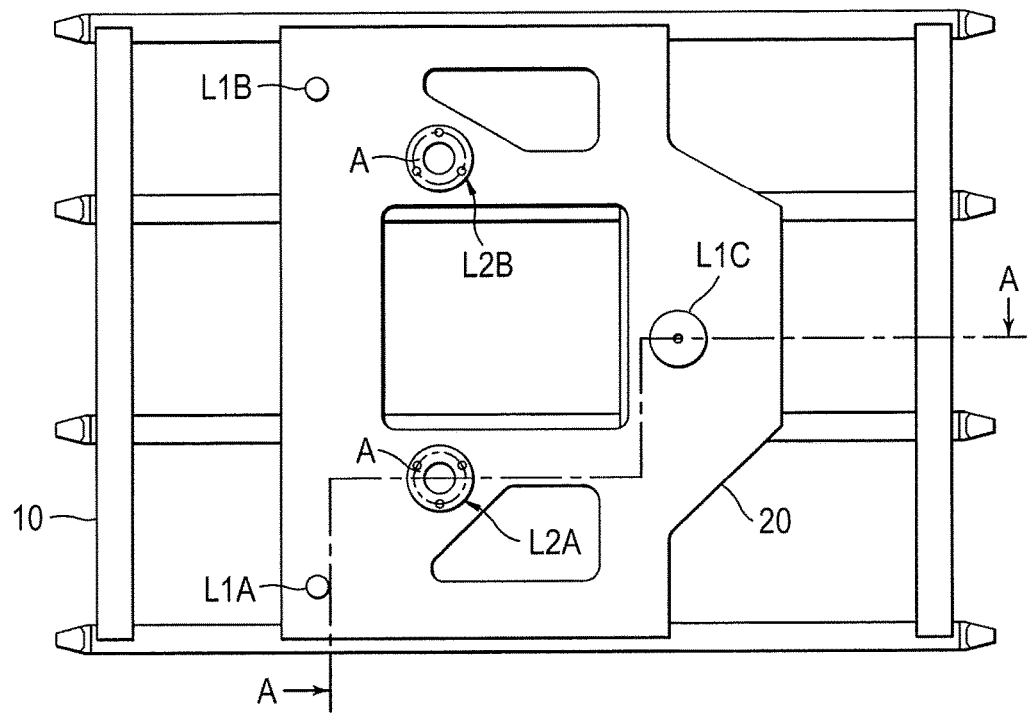
FIG. 3 is a view from above of the supporting structure of the invention.
Figure 4:
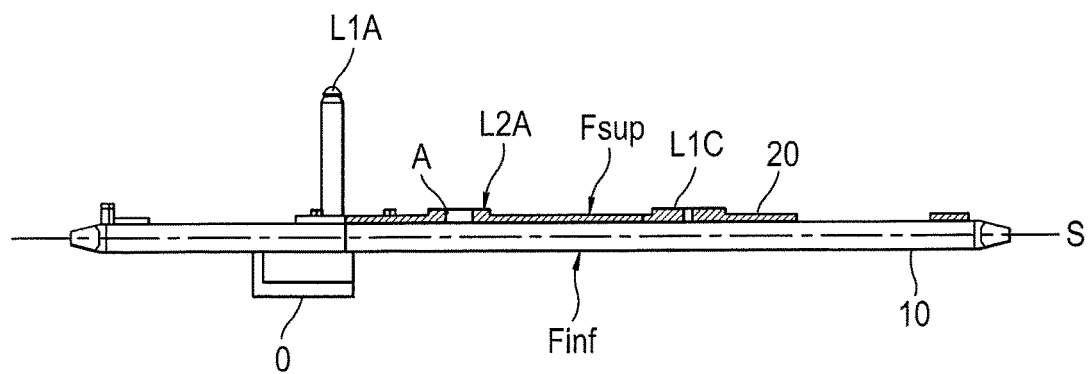
FIG. 4 is a view of the supporting structure shown in FIG. 3 along the section A-A.

FIGS. 2, 3 and 4 represent the supporting structure 1 in several views making it possible for their part to better see the tray 20 that can just be seen in FIG. 1 under the battery B. These figures make it possible more particularly to distinguish first and second connecting elements of this structure 1 in the absence of a battery B.

According to the embodiment shown, these first and second connecting elements are supported by the tray 20.

The first connecting elements are formed on the top face Fsup of this tray 20 designed to interact with the battery B. The second connecting elements are formed on another bottom face Finf of this tray 20 designed to interact with a device on which it rests, of the conveyor or lift-table type.

According to FIG. 4, the top face Fsup designed to interact with the battery B, and the bottom face Finf designed to interact with the handling device on which the supporting structure 1 rests are opposite faces of the tray 20.

Two of the first connecting elements are formed by fingers L1A, L1B which are capable of being engaged in corresponding orifices in the battery B. Alternatively, an arrangement could be made for the fingers to be provided on the battery B and for corresponding orifices to be made on the supporting structure 1.

The three connecting elements L1A, L1B and L1C are positioned so that they can perform a reference positioning of the bottom face of the battery B in a plane parallel to the bearing plane on the tray 20, called the supporting plane S in FIG. 4, that is to say that the three connecting elements L1A, L1B and L1C are not aligned in this plane, as shown in FIG. 3. Therefore, these three connecting elements L1A, L1B and L1C can form a triangle.

The third first connecting element L1C is preferably able to move in translation along an axis normal to the supporting plane S, so as to vary the inclination of the battery B supported on the supporting structure 1 and thus serve as a spacer for adjusting the inclination of the battery B. This adjustment is therefore carried out during the finalization of the supporting structure 1 and then inspected throughout the service life of the latter.

These first connecting elements L1A, L1B and L1C may be attached in a removable manner to the supporting structure 1 and preferably to the tray 20.

For example, the fingers L1A and L1B may be removably attached to the tray 20 with the aid of pins. The third first connecting element L1C can be formed by a screw the flat head of which comes into contact with the battery B so that by tightening or loosening the screw, the inclination of the battery B can be modified.

Figure 5:
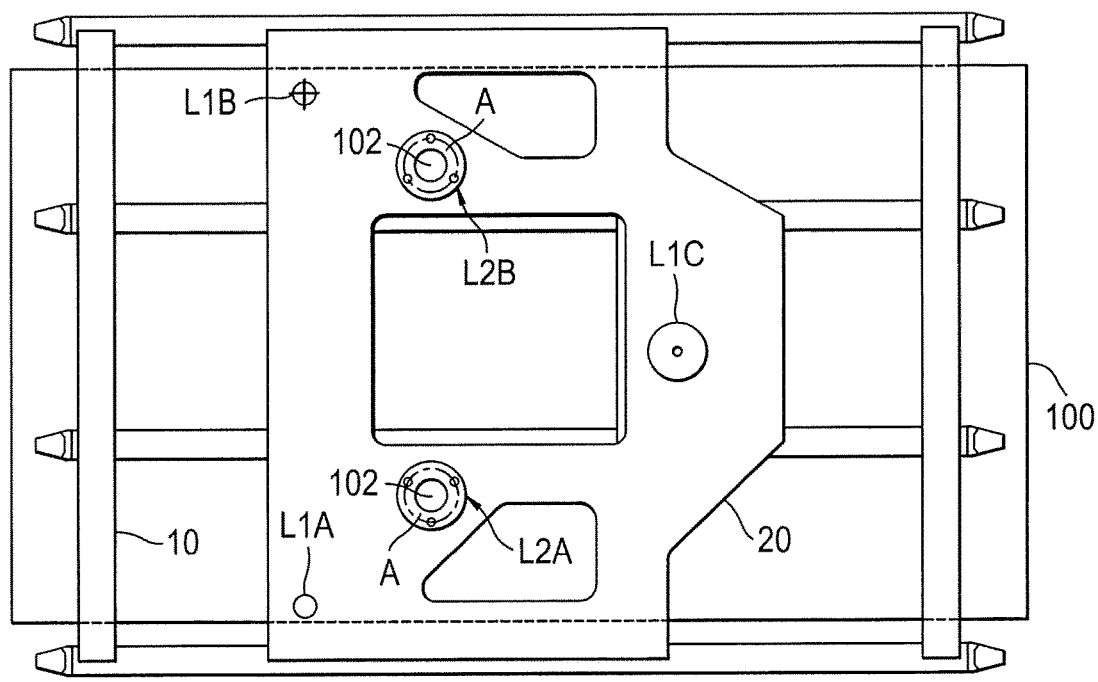
FIG. 5 is a view from above of a supporting structure and handling device.

The result of this is easier maintenance and conformity inspection operations and a possibility to standardize the supporting structure 1 in order to make it fit several types of battery B. p As shown in FIGS. 4 and 5, the second connecting elements L2A, L2B are formed on the bottom face Finf of the tray 20 by orifices capable of interacting with guide pins 102 for guiding the handling device 100 on which the supporting structure 1 rests, so that a reference positioning can be performed between said structure 1 and the handling device.

As shown in the figures, the second connecting elements L2A and L2B may comprise rings A removably attached to and centered on orifices of greater diameter formed in the tray 20. The latter orifices may be through-orifices or non-through-orifices.

The guide pins then interact with the internal diameters of the rings A which may be replaced during the maintenance operations when they no longer conform, for example because of wear by abrasion, or which can be adapted according to the type of device on which the supporting structure 1 rests. Alternatively, it is possible to envisage replacing the rings A by guide fingers that can be removable and make orifices in the handling device.

By virtue of the first and second connecting elements, the battery B can be inserted into a housing of the vehicle with an electric traction system designed for this purpose automatically and reproducibly with great precision. Specifically, the battery B is geometrically reference positioned relative to the supporting structure 1, the supporting structure 1 itself being geometrically reference positioned relative to the handling device on which it rests. It is therefore possible to ensure continuity of the locating of the position of the battery B in order to insert it into the vehicle from the handling device, conveyor or lift table. This handling device can then be of any type and not be adapted to the battery B to be conveyed, which makes it possible, in one and the same battery-exchange station, to use only one type of handling device that is not differentiated depending on the type of battery to be exchanged, only the supporting structure 1 being specific.

As shown in FIGS. 2 and 4, it is possible to provide eyelets O like those that are usually found on handling pallets, on the supporting structure 1, for example on the frame 10. It is therefore possible, by virtue of a pallet-handling truck to lift the battery B without risk of damage, since the fork arms of the truck interact with the eyelets O situated on the structure 1.

It is also possible to make arrangements to furnish the supporting structure 1 with indexing means, not shown, in order to allow easier transport of said structure 1 on a conveyor.

Such a supporting structure 1 for a battery B can be used during the removal or the installation of a battery in a vehicle, for example in the after-sales network or equally in a battery-exchange station. In the context of these battery-exchange stations, the battery B can be conveyed on the supporting structure 1 in all the zones of the latter and particularly between the installation-removal zone and the recharging zone.

According to the invention, the removal of a battery is performed according to the following steps.

The supporting structure 1 is placed on the handling device, for example a lift table, by making the second connecting elements L2A, L2B interact with the corresponding guide fingers of the handling device for the reference positioning of the structure 1 with the handling device.

Then, the handling device is brought closer until the first connecting elements L1A, L1B and L1C interact with the battery B. Thus, the handling device is placed in reference position with the battery B.

The battery B is unlocked from its housing in the vehicle.

The battery B thus being released from the vehicle, it is then sufficient to move the handling device away from the vehicle so that the battery B is extracted from its housing.

It is then possible to store the battery B with the supporting structure 1 or else to store it on its own without the supporting structure 1.

A battery B is installed in a vehicle according to steps similar to the removal in the reverse order.

If the battery B has not been stored on the supporting structure 1, prior to the other steps, the battery B is placed on the supporting structure 1 so that the first connecting elements L1A, L1B and L1C interact with the battery B. Thus, the supporting structure 1 is placed in reference position with the battery B that it supports.

Then, the supporting structure 1 is placed on the handling device so that the connecting elements L2A, L2B interact with the corresponding guide fingers of the handling device for the reference positioning of the structure 1 with the handling device. Thus, the handling device is placed in reference position with the battery B.

Then, the battery B is brought closer and carried up to its housing in the vehicle by actuating the handling device.

Finally, the battery B is locked in the housing of the vehicle.

In the context of a battery-exchange station, steps for removing the discharged battery B that arrives with the received vehicle are carried out and then another recharged battery B is installed in the vehicle.

These installation and removal steps can be carried out according to the methods described above if the battery is stored on a supporting structure 1. Therefore, the discharged battery B is removed in a removal-installation zone and is then conveyed to a recharging or storage zone, while another recharged battery B is conveyed from a recharging or storage zone to the removal-installation zone and then installed in the vehicle.

During the use of the supporting structure 1 according to the invention, it is therefore possible to remove and reinstall batteries B of different types with a single standard recharging station, only the supporting structure 1 being specific to the batteries B to be handled.

The invention claimed is:

1. A supporting structure configured to support a traction battery of a vehicle including an electric traction system during conveyance, comprising:
   a frame; and
   a tray installed on a top face of the frame to retain a traction battery, the tray including at least three first connecting elements installed on a top face of the tray and configured to perform a geometric reference positioning of the traction battery relative to the supporting structure, the at least three first connecting elements including two fingers extending up from the top face of the tray and an element that is axially adjustable,
   wherein at least one of the connecting elements is configured to allow a correction of the reference positioning of the battery.

2. The supporting structure as claimed in claim 1, wherein the tray is installed in a removable manner on the frame.

3. The supporting structure as claimed in claim 1, wherein the tray includes at least one second connecting element formed on a bottom face of the tray and configured to perform a reference positioning of the structure on a handling device.

4. The supporting structure as claimed in claim 3, wherein the second connecting element includes rings centered on orifices in the bottom face of the tray.

5. The supporting structure as claimed in claim 3, wherein the first connecting elements and the second connecting element are installed in a removable manner on the tray.

6. The supporting structure as claimed in claim 1, wherein the frame includes eyelets extending from a bottom surface of the frame.

7. The supporting structure as claimed in claim 1, wherein the two fingers are removably attached to top face of the tray via pins and the element that is axially adjustable is a screw.

8. A method for removing a battery from a housing formed in a vehicle, comprising:
   placing a supporting structure, including a frame and a tray installed on a top face of the tray, on a handling device by inserting guide fingers of the handling device into second connecting elements formed on a bottom surface of the tray;

bringing the handling device closer to the battery until first connecting elements of the supporting structure interact with the battery, the first connecting elements being positioned on a top face of the tray and including two fingers extending up from the top face of the tray into orifices in a bottom face of the battery and an element that is axially adjustable to vary an inclination of the battery supported on the support structure;

unlocking the battery from a housing of the battery in the vehicle; and moving the handling device away from the vehicle so that the battery is extracted from a housing of the battery.

9. A method for exchanging a battery in a battery-exchange station, comprising:

removing a discharged battery housed in a vehicle according to the removal method of claim 8, the removing being performed in a removal-installation zone;

then installing a recharged battery in the housing of the vehicle in the removal-installation zone; and wherein the discharged and recharged batteries are conveyed respectively from the removal-installation zone to a recharging zone provided in the station, and from the recharging zone to the removal-installation zone while resting on supporting structures.

10. A method for installing a battery in a housing formed in a vehicle, comprising:

placing a supporting structure, including a frame and a tray installed on a top face of the tray, on a handling device by inserting guide fingers of the handling device into second connecting elements formed on a bottom surface of the tray;

placing a battery on the supporting structure, including interacting first connecting elements of the supporting structure with the battery, the first connecting elements being positioned on a top face of the tray and including two fingers extending up from the top face of the tray into orifices in a bottom face of the battery and an element that is axially adjustable to vary an inclination of the battery supported on the support structure;

carrying the battery up to a housing of the battery in the vehicle by actuating the handling device; and locking the battery in the housing of the vehicle.

* * * * *